United States Patent
Barel et al.

(10) Patent No.: US 10,678,348 B2
(45) Date of Patent: Jun. 9, 2020

(54) TOUCH DETECTION ON AN UNGROUNDED PEN ENABLED DEVICE

(71) Applicant: Microsoft Technology Licensing, LLC, Redmond, WA (US)

(72) Inventors: Eliyahu Barel, Rosh HaAyin (IL); Michael Orlovsky, Hod-HaSharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 15/917,865

(22) Filed: Mar. 12, 2018

(65) Prior Publication Data

US 2019/0278388 A1 Sep. 12, 2019

(51) Int. Cl.
G06F 3/0354 (2013.01)
G06F 3/044 (2006.01)
G06F 3/041 (2006.01)

(52) U.S. Cl.
CPC .......... *G06F 3/03545* (2013.01); *G06F 3/044* (2013.01); *G06F 3/0412* (2013.01); *G06F 3/0416* (2013.01); *G06F 2203/04104* (2013.01); *G06F 2203/04108* (2013.01)

(58) Field of Classification Search
CPC ...... G06F 3/0416; G06F 3/044; G06F 3/0418; G06F 3/03545; G06F 3/038
See application file for complete search history.

(56) References Cited

U.S. PATENT DOCUMENTS

| 4,398,720 A | 8/1983 | Jones et al. |
| 4,591,710 A | 5/1986 | Komadina et al. |
| 4,672,154 A | 6/1987 | Rodgers et al. |
| 4,686,332 A | 8/1987 | Greanias et al. |
| 4,707,845 A | 11/1987 | Krein et al. |
| 4,791,592 A | 12/1988 | Burgess |

(Continued)

FOREIGN PATENT DOCUMENTS

| CN | 202092590 U | 12/2011 |
| CN | 103576997 A | 2/2014 |

(Continued)

OTHER PUBLICATIONS

"International Search Report and Written Opinion Issued in PCT Patent Application No. PCT/US19/027572", dated Jul. 2, 2019, 12 Pages.

(Continued)

*Primary Examiner* — Sepehr Azari

(57) ABSTRACT

A method for touch detection on an ungrounded pen enabled device includes sampling output in a frequency range of a signal emitted from a stylus over a stylus sampling window, detecting touch input from a finger or hand based on detecting a gain between a touch threshold and a stylus threshold, wherein the touch threshold is below the stylus threshold over at least two consecutive columns and two consecutive rows of the sensor and reporting coordinates of the touch input based on detecting the touch input. Stylus input is detected based on detecting a gain above a stylus threshold in at least one column and one row of the sensor and coordinates of the stylus are reported based on stylus input being detected. Sampling is performed simultaneously from both columns and rows of a grid based capacitive sensor.

19 Claims, 13 Drawing Sheets

(56) References Cited

U.S. PATENT DOCUMENTS

| | | | |
|---|---|---|---|
| 4,977,397 A | 12/1990 | Kuo et al. |
| 5,117,071 A | 5/1992 | Greanias et al. |
| 5,129,654 A | 7/1992 | Bogner |
| 5,239,139 A | 8/1993 | Zuta |
| 5,528,002 A | 6/1996 | Katabami |
| 5,543,588 A | 8/1996 | Bisset et al. |
| 5,574,262 A | 11/1996 | Petty |
| 5,691,512 A | 11/1997 | Obi |
| 5,825,345 A | 10/1998 | Takahama et al. |
| 5,831,600 A | 11/1998 | Inoue et al. |
| 5,841,078 A | 11/1998 | Miller et al. |
| 5,854,881 A | 12/1998 | Yoshida et al. |
| 5,859,392 A | 1/1999 | Petty |
| 5,889,511 A | 3/1999 | Ong et al. |
| 5,905,489 A | 5/1999 | Takahama et al. |
| 5,923,320 A | 7/1999 | Murakami et al. |
| 5,973,676 A | 10/1999 | Kawakura |
| 6,020,849 A | 2/2000 | Fukuzaki |
| 6,081,259 A | 6/2000 | Teterwak |
| 6,229,529 B1 | 5/2001 | Yano et al. |
| 6,239,389 B1 | 5/2001 | Allen et al. |
| 6,417,846 B1 | 7/2002 | Lee |
| 6,459,424 B1 | 10/2002 | Resman |
| 6,690,156 B1 | 2/2004 | Weiner et al. |
| 6,888,536 B2 | 5/2005 | Westerman et al. |
| 7,244,901 B1 | 7/2007 | Liao et al. |
| 7,248,249 B2 | 7/2007 | Kong et al. |
| 7,292,229 B2 | 11/2007 | Morag et al. |
| 7,372,455 B2 | 5/2008 | Perski et al. |
| 7,656,396 B2 | 2/2010 | Bosch et al. |
| 7,725,089 B2 | 5/2010 | Lee et al. |
| 7,843,439 B2 | 11/2010 | Perski et al. |
| 7,868,874 B2 | 1/2011 | Reynolds |
| 7,995,036 B2 | 8/2011 | Perski et al. |
| 8,059,102 B2 | 11/2011 | Rimon et al. |
| 8,278,571 B2 | 10/2012 | Orsley |
| 8,289,289 B2 | 10/2012 | Rimon et al. |
| 8,305,358 B2 | 11/2012 | Klinghult et al. |
| 8,402,391 B1 | 3/2013 | Doray et al. |
| 8,420,958 B2 | 4/2013 | Lu et al. |
| 8,482,545 B2 | 7/2013 | King-Smith et al. |
| 8,542,210 B2 | 9/2013 | Westerman |
| 8,633,718 B2 * | 1/2014 | Yeh .......................... G06F 3/045 |
| | | | 324/691 |
| 8,660,978 B2 | 2/2014 | Hinckley et al. |
| 8,810,542 B2 | 8/2014 | Yousefpor |
| 8,994,692 B2 | 3/2015 | Yumoto et al. |
| 9,110,543 B1 | 8/2015 | Dabell |
| 9,262,010 B2 | 2/2016 | Bulea |
| 9,367,168 B2 | 6/2016 | Ahn et al. |
| 9,495,052 B2 | 11/2016 | Shepelev |
| 9,626,020 B2 | 4/2017 | Durojaiye et al. |
| 9,632,622 B2 | 4/2017 | Hotelling et al. |
| 9,823,774 B2 | 11/2017 | Winebrand |
| 10,025,403 B2 * | 7/2018 | Haran .................... G06F 3/0383 |
| 2002/0089491 A1 | 7/2002 | Willig |
| 2003/0080946 A1 | 5/2003 | Chuang |
| 2004/0027340 A1 | 2/2004 | Muraoka et al. |
| 2004/0100450 A1 | 5/2004 | Choi |
| 2004/0155871 A1 | 8/2004 | Perski et al. |
| 2004/0160426 A1 | 8/2004 | Degroot et al. |
| 2004/0178995 A1 | 9/2004 | Sterling |
| 2005/0189154 A1 | 9/2005 | Perski et al. |
| 2005/0271259 A1 | 12/2005 | Lorch et al. |
| 2006/0012580 A1 | 1/2006 | Perski et al. |
| 2006/0017709 A1 | 1/2006 | Okano |
| 2006/0097991 A1 | 5/2006 | Hotelling et al. |
| 2006/0109252 A1 | 5/2006 | Kolmykov-zotov et al. |
| 2006/0139339 A1 | 6/2006 | Pechman et al. |
| 2007/0152976 A1 | 7/2007 | Townsend et al. |
| 2007/0285404 A1 | 12/2007 | Rimon et al. |
| 2008/0012835 A1 | 1/2008 | Rimon et al. |
| 2008/0012838 A1 | 1/2008 | Rimon |
| 2008/0128180 A1 | 6/2008 | Perski et al. |
| 2008/0238885 A1 | 10/2008 | Zachut et al. |
| 2009/0020343 A1 | 1/2009 | Rothkopf et al. |
| 2009/0095540 A1 | 4/2009 | Zachut et al. |
| 2009/0160787 A1 | 6/2009 | Westerman et al. |
| 2009/0251434 A1 | 10/2009 | Rimon et al. |
| 2010/0060608 A1 | 3/2010 | Yousefpor |
| 2010/0155153 A1 | 6/2010 | Zachut |
| 2010/0156851 A1 | 6/2010 | Kurokawa |
| 2010/0289752 A1 | 11/2010 | Birkler |
| 2010/0321338 A1 | 12/2010 | Ely |
| 2011/0012840 A1 | 1/2011 | Hotelling et al. |
| 2011/0012855 A1 | 1/2011 | Yeh et al. |
| 2011/0084929 A1 | 4/2011 | Chang et al. |
| 2011/0155479 A1 | 6/2011 | Oda et al. |
| 2011/0175835 A1 | 7/2011 | Wang |
| 2011/0254802 A1 | 10/2011 | Philipp |
| 2011/0254807 A1 | 10/2011 | Perski et al. |
| 2011/0284632 A1 | 11/2011 | Mullen et al. |
| 2011/0291944 A1 | 12/2011 | Simmons et al. |
| 2011/0310040 A1 | 12/2011 | Ben-Shalom et al. |
| 2012/0013555 A1 | 1/2012 | Maeda et al. |
| 2012/0050180 A1 | 3/2012 | King et al. |
| 2012/0068964 A1 * | 3/2012 | Wright ................ G06F 3/03545 |
| | | | 345/174 |
| 2012/0105362 A1 | 5/2012 | Kremin et al. |
| 2012/0133616 A1 | 5/2012 | Nishihara et al. |
| 2012/0158629 A1 | 6/2012 | Hinckley et al. |
| 2012/0182238 A1 | 7/2012 | Lee |
| 2012/0249457 A1 | 10/2012 | Chou et al. |
| 2012/0262411 A1 * | 10/2012 | Ahn ...................... G06F 3/0416 |
| | | | 345/174 |
| 2013/0009896 A1 | 1/2013 | Zaliva |
| 2013/0009907 A1 | 1/2013 | Rosenberg et al. |
| 2013/0027361 A1 | 1/2013 | Perski et al. |
| 2013/0127757 A1 | 5/2013 | Mann et al. |
| 2013/0132903 A1 | 5/2013 | Krishnaswamy |
| 2013/0176280 A1 | 7/2013 | Wu et al. |
| 2013/0198694 A1 | 8/2013 | Rahman et al. |
| 2013/0249950 A1 | 9/2013 | Mahmoud et al. |
| 2013/0265258 A1 | 10/2013 | Garfinkel et al. |
| 2013/0278543 A1 | 10/2013 | Hsu et al. |
| 2013/0285973 A1 | 10/2013 | Elias et al. |
| 2013/0298642 A1 | 11/2013 | Gillette, II |
| 2013/0300672 A1 | 11/2013 | Griffin |
| 2013/0300696 A1 | 11/2013 | Haran et al. |
| 2013/0328832 A1 | 12/2013 | Boumgarten |
| 2014/0099971 A1 | 4/2014 | Lim et al. |
| 2014/0152620 A1 | 6/2014 | Perski et al. |
| 2014/0168116 A1 | 6/2014 | Sasselli et al. |
| 2014/0320445 A1 | 10/2014 | Kim |
| 2015/0049044 A1 * | 2/2015 | Yousefpor .............. G06F 3/044 |
| | | | 345/174 |
| 2015/0070310 A1 | 3/2015 | Suzuki et al. |
| 2015/0109243 A1 | 4/2015 | Jun et al. |
| 2015/0112801 A1 | 4/2015 | Nice et al. |
| 2015/0133164 A1 | 5/2015 | Song et al. |
| 2015/0177089 A1 | 6/2015 | Ferran et al. |
| 2015/0193025 A1 | 7/2015 | Rebeschi et al. |
| 2015/0363067 A1 | 12/2015 | Winebrand |
| 2015/0379400 A1 | 12/2015 | Tatourian et al. |
| 2016/0041685 A1 | 2/2016 | Perski et al. |
| 2016/0054831 A1 | 2/2016 | Tsai et al. |
| 2016/0098742 A1 | 4/2016 | Minicucci et al. |
| 2016/0142884 A1 | 5/2016 | Sears |
| 2016/0157062 A1 | 6/2016 | Shim et al. |
| 2016/0183060 A1 | 6/2016 | Seyde et al. |
| 2016/0209063 A1 | 7/2016 | Fang |
| 2016/0216794 A1 | 7/2016 | Yoon et al. |
| 2016/0266673 A1 | 9/2016 | Dinu et al. |
| 2016/0274700 A1 * | 9/2016 | Mishalov .............. G06F 3/0418 |
| 2017/0177138 A1 * | 6/2017 | Orlovsky .............. G06F 3/0416 |
| 2017/0255282 A1 | 9/2017 | Winebrand et al. |
| 2018/0061271 A1 | 3/2018 | Mohammed et al. |
| 2018/0113523 A1 * | 4/2018 | Hara .................... G06F 3/03545 |
| 2019/0342401 A1 | 11/2019 | Mishra et al. |

FOREIGN PATENT DOCUMENTS

| | | |
|---|---|---|
| EP | 0684580 A2 | 11/1995 |
| EP | 1422601 A1 | 5/2004 |

(56) References Cited

FOREIGN PATENT DOCUMENTS

| | | | |
|---|---|---|---|
| EP | 1717677 | A2 | 11/2006 |
| EP | 2659832 | A1 | 11/2013 |
| JP | 05173698 | A | 7/1993 |
| JP | 07311647 | A | 11/1995 |
| JP | 09325852 | A | 12/1997 |
| JP | 10031545 | A | 2/1998 |
| JP | 2002207563 | A | 7/2002 |
| TW | 201537442 | A | 10/2015 |
| WO | 03019346 | A1 | 3/2003 |
| WO | 2005081631 | A2 | 9/2005 |
| WO | 2009108334 | A2 | 9/2009 |
| WO | 2011154950 | A1 | 12/2011 |
| WO | 2012111010 | A1 | 8/2012 |
| WO | 2012140656 | A1 | 10/2012 |
| WO | 2013171747 | A2 | 11/2013 |
| WO | 2014145872 | A1 | 9/2014 |
| WO | 2015006312 | A2 | 1/2015 |
| WO | 2017023557 | A1 | 2/2017 |

OTHER PUBLICATIONS

"Non Final Office Action Issued in U.S. Appl. No. 15/967,691", dated Feb. 25, 2019, 18 Pages.
"AN11623 LPC82x Touch Solution Hardware Design Guide", Retrieved From: https://www.mouser.com/pdfdocs/NXPLPC82xTouchSolutionHardwareDesignGuide.PDF, Dec. 22, 2014, 18 Pages.
"Capacitive Sensing Solutions from Silicon Labs", Retrieved From: https://web.archive.org/web/20140831110204/http://www.silabs.com/Support%20Documents/TechnicalDocs/CapacitiveTouchSenseTechnologySPKR.pdf, Aug. 31, 2014, 53 Pages.
"MTI Instruments Capacitance Measurement Products", Retrieved From: http://www.mtiinstruments.com/technology/Capacitance.aspx, Retrieved on: Jul. 16, 2015, 9 Pages.
"Office Action Issued in European Patent Application No. 05709125.8.", dated Nov. 22, 2013, 4 Pages.
"Office Action Issued in European Patent Application No. 05709125.8", dated Jun. 20, 2013, 4 Pages.
"Office Action Issued in European Patent Application No. 05709125.8", dated Jul. 19,2012, 4 Pages.
"Office Action Issued in European Patent Application No. 05709125.8", dated May 15,2014, 5 Pages.
"Office Action Issued in European Patent Application No. 05709125.8", dated Nov. 13, 2012, 7 Pages.
"Summons to Attend Oral Hearing Issued in European Patent Application No. 05709125.8", dated Dec. 15, 2014, 8 Pages.
"Supplementary Search Report Issued in European Patent Application No. 05709125.8", dated Mar. 27, 2012, 3 Pages.
"Non Final Office Action Issued in U.S. Appl. No. 11/063,535", dated May 27, 2009, 23 Pages.
"Non Final Office Action Issued in U.S. Appl. No. 11/063,535", dated May 25, 2010, 30 Pages.
"Final Office Action Issued in U.S. Appl. No. 11/063,535.", dated Dec. 22, 2010, 15 Pages.
"Final Office Action Issued in U.S. Appl. No. 11/063,535.", dated Dec. 8, 2009, 29 Pages.
"Final Office Action Issued in U.S. Appl. No. 13/171,601", dated Jun. 5, 2012, 25 Pages.
"Non Final Office Action Issued in U.S. Appl. No. 13/171,601.", dated Nov. 15, 2011, 19 Pages.
"Non Final Office Action Issued in U.S. Appl. No. 13/644,331.", dated Mar. 28, 2013, 22 Pages.
"Final Office Action Issued in U.S. Appl. No. 13/892,381", dated Jun. 14, 2017, 18 Pages.
"Final Office Action Issued in U.S. Appl. No. 13/892,381.", dated Jul. 8, 2016, 22 Pages.
"Final Office Action Issued in U.S. Appl. No. 13/892,381", dated Oct. 5, 2015, 25 Pages.
"Non Final office Action Issued in U.S. Appl. No. 13/892,381", dated Dec. 30, 2016, 18 Pages.
"Non Final Office Action Issued in U.S. Appl. No. 13/892,381", dated Jan. 13, 2016, 20 Pages.
"Non Final Office Action Issued in U.S. Appl. No. 13/892,381.", dated Mar. 18, 2015, 20 Pages.
"Final Office Action Issued in U.S. Appl. No. 14/977,721", dated Nov. 30, 2017, 17 Pages.
"Final Office Action Issued in U.S. Appl. No. 14/977,721", dated Nov. 8, 2018, 18 Pages.
"Non Final Office Action Issued in U.S. Appl. No. 14/977,721", dated Jun. 2, 2017, 14 Pages.
"Final Office Action Issued in U.S. Appl. No. 14/977,766", dated Oct. 27, 2017, 14 Pages.
"Non Final Office Action Issued in U.S. Appl. No. 14/977,766", dated Jun. 1, 2017, 11 Pages.
"Non Final Office Action Issued in U.S. Appl. No. 14/977,766", dated Feb. 16, 2018, 15 Pages.
"Non Final Office Action Issued in U.S. Appl. No. 14/977,721", dated Apr. 5, 2018, 17 Pages.
"Non Final Office Action Issued in U.S. Appl. No. 15/050,656", dated Apr. 3, 2017, 9 Pages.
"Non Final Office Action Issued in U.S. Appl. No. 15/070,380", dated Jan. 11, 2018, 14 Pages.
"Office Action Issued in Japanese Patent Application No. 2007500353", dated May 21, 2010, 8 Pages.
"Office Action Issued in Japanese Patent Application No. 2007-500353", dated Jun. 2, 2011, 4 Pages.
Allan, Roger, "How to Select the Right Touch Sensing Approach for Your Design", Retrieved From: http://www.digikey.com/es/articles/techzone/2011/aug/how-to-select-the-right-touch-sensing-approach-for-your-design, Aug. 25, 2011, 4 Pages.
Camacho, et al., "Designing Touch Sensing Electrodes: Electrical Considerations and Recommended Layout Patterns", In the Book of Designing Touch Sensing Electrodes: Electrical Considerations and Recommended Layout Patterns, Published by Citeseer, Jul. 2011, 28 Pages.
Harrison, et al., "Capacitive Fingerprinting: Exploring User Differentiation by Sensing Electrical Properties of the Human Body", In Proceedings of the 25th annual ACM symposium on User Interface Software and Technology, Oct. 7, 2012, pp. 537-544.
Hughes, Neil, "Apple's Stylus Receiver Concept Would Improve the Precision of Digital Pen-Based Input", Retrieved From: https://appleinsider.com/articles/15/01/29/apples-stylus-receiver-concept-would-improve-the-prevision-of-digital-pen-based-input ,Jan. 29, 2015, 9 Pages.
Park, et al., "A Pen-Pressure-Sensitive Capacitive Touch System Using Electrically Coupled Resonance Pen", In the International Journal of IEEE on Solid-State Circuits, vol. 51, Issue 1, Jan. 2016, pp. 168-176.
"International Search Report and Written Opinion Issued in Patent Application No. PCT/IL05/00229", dated May 23, 2006, 8 Pages.
"Invitation to pay additional fees Issued in PCT Application No. PCT/IL2013/050417", dated Sep. 4, 2013, 6 Pages.
Wang, et al., "Detecting and Leveraging Finger Orientation for Interaction with Direct-Touch Surfaces", In Proceedings of the 22nd annual ACM symposium on User interface software and technology, Oct. 4, 2009, pp. 23-32.
"International Search Report & Written Opinion Issued in PCT Application No. PCT/IL2013/050417", dated Dec. 20, 2013, 20 Pages.
"International Preliminary Report on Patentability Issued in PCT Application No. PCT/US2016/022760", dated Jun. 6, 2017, 16 Pages.
"International Search Report & Written Opinion Issued in PCT Application No. PCT/US2016/022760", dated Jun. 3, 2016, 14 Pages.
"Second Written Opinion Issued in PCT Application No. PCT/US2016/022760", dated Feb. 1, 2017, 8 Pages.
"International Search Report and Written Opinion Issued in PCT Application No. PCT/US2016/066737", dated Apr. 11, 2017, 12 Pages.
"Notice of Allownace Issued in U.S. Appl. No. 14/977,721", dated May 17, 2019, 6 Pages.

(56) References Cited

OTHER PUBLICATIONS

"International Search Report and Written Opinion Issued in PCT Application No. PCT/US2019/020463", dated Apr. 18, 2019, 13 Pages.

"Final Office Action Issued in U.S. Appl. No. 15/967,691", dated Aug. 28, 2019, 18 Pages.

"Notice of Allowance Issued in U.S. Appl. No. 15/967,691", dated Nov. 7, 2019, 10 Pages.

* cited by examiner

TOUCH DETECTION ON AN UNGROUNDED PEN ENABLED DEVICE

FIELD AND BACKGROUND OF THE INVENTION

Computing devices that allow a user to provide finger touch input and also allow a user to provide input with an active stylus are known. Many of these computing devices are designed to be self powered and handheld, e.g. laptops, trackpads, MP3 players and smart-phones. Others may be designed to be desktop devices. A digitizer system for detecting finger touch input and stylus input may be integrated on a touch screen to form a touch sensitive screen and may also be integrated on a trackpad.

A grid based capacitive sensor is one type of digitizer sensor that may be integrated with an electronic display of the computing device to form the touch sensitive screen and may also be used on a trackpad. Grid based capacitive sensors typically track free style input provided with an object such as a finger or a conductive object with a mutual capacitive or self-capacitive detection method. During both mutual capacitive detection and self-capacitive detection, a circuit associated with the digitizer sensor transmits a drive signal on one or more grid lines of the digitizer sensor and detects a capacitive load in response to the drive signal. The circuit may also be configured to detect signals emitted by a stylus and track position of the stylus. The digitizer sensor together with the associated circuit is a digitizer system. Coordinates of the tracked object (stylus and finger) may be reported to the computing device and interpreted as user commands or user inputs for commands.

SUMMARY OF THE INVENTION

According to example implementations of the disclosure there is provided a method for detecting touch input over a sampling window configured for sampling output in a frequency band of a stylus signal. The method may be implemented whenever the computing device with the touch sensitive surface is in an ungrounded state. An ungrounded state may occur while the computing device is not connected to a power supply with a three-prong connector and is not being gripped by the user. While the computing device is ungrounded, the stylus signal may find a path to ground via the user and the stylus signal transmitted through the user may appear at touch locations on the screen. According to example implementations, a digitizer system is configured to detect a stylus signal injected through the user on the digitizer sensor and recognize the input as touch input.

According to example implementations, the digitizer system monitors the grounding state of the device and implements the method when the device is determined to be ungrounded and a signal, e.g. a stylus signal is be detected. According to example implementations, the method improves palm rejection and also provides touch detection with lower power consumption and higher refresh rate. Optionally, a similar method may be implemented over a sampling window dedicated to detect noise and touch may be identified based on noise input being induced on a user touching the touch sensitive surface, e.g. touch sensitive screen or trackpad while the device is ungrounded.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DESCRIPTION OF SPECIFIC EMBODIMENTS OF THE INVENTION

Figure 1:
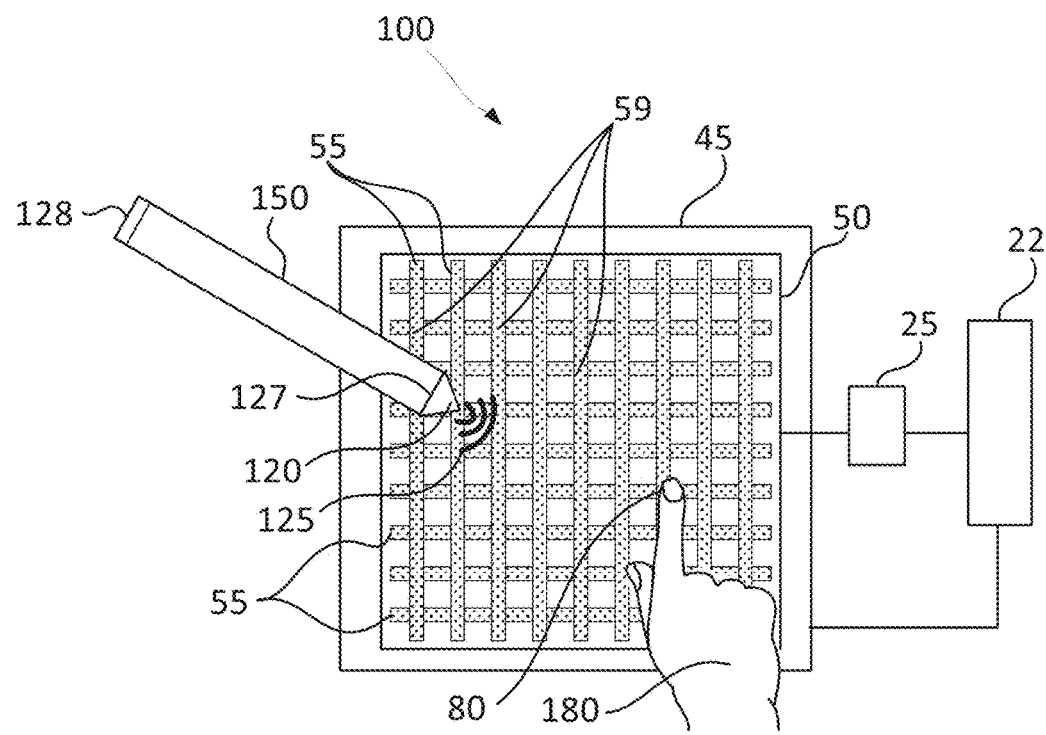
FIG. 1 a simplified block diagram of an exemplary touch and pen enabled computing device in accordance with some embodiments of the present disclosure.
Figure 2:
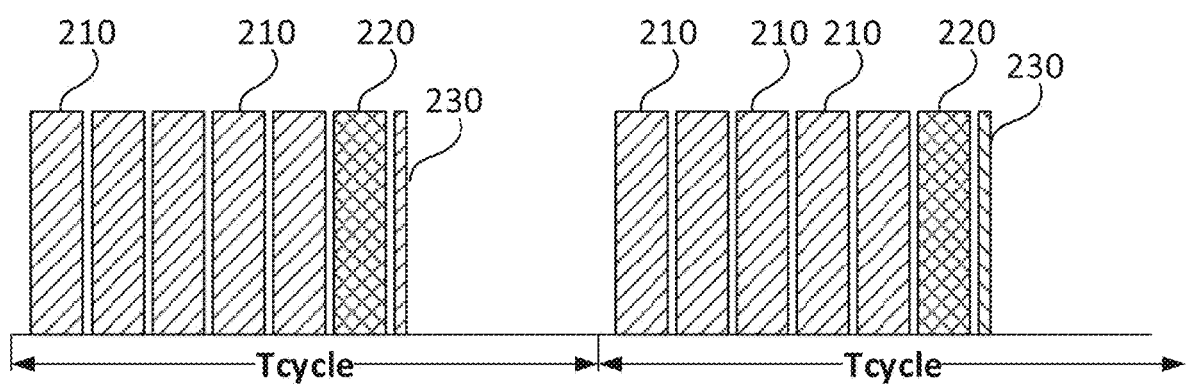
FIG. 2 is a simplified timeline of example sampling windows for sampling a grid based capacitive sensor.

According to some example implementations, a digitizer system detects touch input on a touch sensitive surface based on output in a frequency range of the stylus. While the computing device is ungrounded, the stylus signal may find a path to ground via the user and the stylus signal transmitted through the user may appear at touch locations on the screen. According to some example implementations, these touch locations may be identified by the digitizer system and differentiated from a stylus signal detected at a location near a writing tip of the stylus. The touch locations may be detected over a sampling window dedicated for stylus detection, e.g. together with stylus detection. The differentiation may be based on gain of the output as well as shape of a spread of the output over the sensing surface.

According to some example implementations, touch detection in a frequency range of the stylus is implemented for palm rejection. Palm input is typically difficult to detect based on mutual capacitive detection while the computing device is ungrounded. Due to a known retransmission effect, the relatively large touch area of the palm (large blob) may appear as a plurality of smaller touched areas (smaller blobs) that may be falsely identified as finger touch input. Palm detection based on the stylus signal injected through the user does not suffer from the retransmission effect and therefore the blob associated with palm input corresponds to the shape and size of the palm contact and may be clearly recognized as palm input.

According to some example implementations, touch detection in a frequency range of the stylus is implemented for touch tracking of single touch while the computing device is ungrounded. Tracking touch based on detecting the injected stylus signal may be faster, less processing heavy, and performed with less power expenditure than touch tracking based on mutual capacitive detection. In some example embodiments, the digitizer system may temporarily suspend mutual capacitive detection or may temporarily reduce the refresh rate of mutual capacitive detection while the computing device is determined to be ungrounded and the conditions are suitable for touch detection based detection in a frequency range of the stylus. The digitizer system may in this case track the single touch input simultaneously with stylus detection, e.g. over the same sampling window. Since scanning is not typically needed for stylus signal detection, detection is quicker and the refresh rate may optionally be increased. Optionally, touch detection in a frequency range of the stylus is synchronized with transmission of the stylus signal.

In some example implementations, touch input may be detected on an ungrounded touch sensitive surface based on output in a frequency range of noise in the surrounding environment. For example, noise from florescent lighting or from a two-prong power supply (ungrounded power supply) may be injected through the user and appear at touch locations while the user is interacting with the touch sensitive surface. These touch locations may be tracked while detecting output in a broad frequency band or at frequency bands specified for noise detection. Optionally, touch detection based on noise frequency may be detected in a sampling window at which the expected noise is typically detected. Touch locations may be differentiated from general noise based on gain and shape of a spread of the output over the sensing surface. Optionally, touch detection based on output in a noise frequency range may be performed without stylus transmission.

For purposes of better understanding some embodiments of the present invention, as illustrated in FIGS. 5A-14 of the drawings, reference is first made to the construction and operation of a computing device as illustrated in FIGS. 1-4B.

Reference is now made to FIG. 1 showing a simplified block diagram of an exemplary touch and pen enabled computing device and to a simplified timeline of example sampling windows for sampling a grid based capacitive sensor. Computing device 100 includes a display 45 integrated with a digitizer sensor 50. Sensor 50 may be operated to detect both input by stylus 150 and to detect a finger effect due to one or more fingertips 80 or other conductive objects interacting with sensor 50. Palm input from hand 180 positioned over or resting on sensor 50 may also be detected. Digitizer sensor 50 typically includes a matrix formed with parallel conductive material 55 arranged in rows and columns with a capacitive connection in junction areas 59 formed between rows and columns. Digitizer sensor 50 may be operated by digitizer circuit 25 and may be in communication with host 22. Optionally, sensor 50 may not be integrated with display 45 and may be instead integrated with an alternate sensing surface, e.g., a trackpad.

Digitizer circuit 25 applies mutual capacitive detection or a self-capacitive detection for sensing a touch signal from touch (or hover) of fingertip 80. Typically, mutual capacitive detection provides for detecting coordinates of multiple fingertips 80 touching sensor 50 at the same time (multitouch). Bringing a grounded finger 80 close to the surface of digitizer sensor 50 changes the local electrostatic field and reduces the mutual capacitance at junctions 59 in the touched area. A change in mutual capacitance may be detected by circuit 25 when applying a drive signal along one axis (the drive lines) of the matrix while sampling output on the other axis (the receive lines) to detect a coupled signal. Mutual capacitive detection may be performed over one or more sampling windows 210 (FIG. 2) for each refresh cycle, Tcycle, of digitizer circuit 25. Typically, a plurality of sampling windows 210 is defined to provide for scanning the entire area of sensor 50 one drive at a time or a plurality of drive lines at a time based on mutual capacitive detection.

Finger touch generally has the effect of reducing amplitude of the measured signal. Output from digitizer sensor 50 may be in the form of a heatmap that maps detected amplitudes of the coupled signals at each junction 59. In a heatmap, finger touch produces a negative blob at the touch location. When part of hand 180 (palm) hovers or rests on digitizer sensor 50, a negative blob may also be recorded due to palm input.

Digitizer circuit 25 may also detect input from a stylus 150 emitting a signal 125 from its tip 120, e.g. writing tip. Stylus 150 may also emit a signal from a ring 127 around its tip 120 and from an eraser end 128 of stylus 150. Digitizer circuit 25 may also detect input from ring 127 and eraser end

128. During stylus detection, digitizer circuit 25 may simultaneously sample conductive material 55 forming both the rows and columns to detect signals 125 picked up by conductive material 55 near writing tip 120 (ring 127 or eraser end 128). Digitizer circuit 25 may detect stylus input over a dedicated stylus sampling window 220 (FIG. 2) in which both column and row conductive material 55 (drive and receive lines) are sampled.

Signal 125 may be a pulsed signal transmitted at a defined repeat rate, e.g. every 5-20 msec. The pulsed signal may include a position signal (or beacon) and optionally a train of data defining a plurality of parameters. Optionally, stylus 150 is pressure sensitive and the data includes information indicating that the stylus is in one of a hover or touch operational mode. In some example embodiments, the data is based on a pressure sensor associated with writing tip 125 (or eraser end 128). Optionally, a separate sampling window may be defined to detect the train of data. Synchronization may be established between transmission of signal 125 and stylus sampling window 220. Optionally, digitizer circuit 25 synchronizes with transmissions of signal 125 and stylus sampling window 220 is adjusted based on timings of signal 125. Optionally, while digitizer circuit 25 is searching for stylus signal 125 more than one stylus sampling window 220 is defined per refresh cycle, Tcycle, of digitizer circuit 25.

Digitizer circuit 25 may sample output in a frequency band of the drive signal over mutual capacitive detection sampling windows 210 and may sample output in a frequency band of an expected stylus signal over stylus detection windows 220. Optionally, digitizer circuit 25 may also operate additional sampling windows such as noise sampling windows 230. Optionally, a frequency band for sampling over noise sampling window 230 may be defined over a wider frequency band that may include both frequency band of the drive signal and frequency band of an expected stylus signal.

Output from digitizer circuit 25 is reported to host 22. Typically, the output provided by digitizer circuit 25 includes coordinates of one or more fingertips 80 and coordinates of writing tip 120 when present. Digitizer circuit 25 may be configured to differentiate between input from fingertip 80 and input from hand 180 and may selectively refrain from reporting coordinates of hand 180 based on a defined palm rejection method. Additional information related to parameters of stylus 150, noise being picked up by sensor 50 and a grounding state of device 100 may also be detected with digitizer circuit 25 based on input from digitizer sensor 50. The additional information detected may be reported to host 22. Digitizer circuit 25 may distinguish between input received by hover or touch and may report one of a hover or touch state to host 22 together with the detected coordinates of the input. Optionally, some or all of the functionalities of digitizer circuit 25 may be integrated into host 22.

Figure 3:
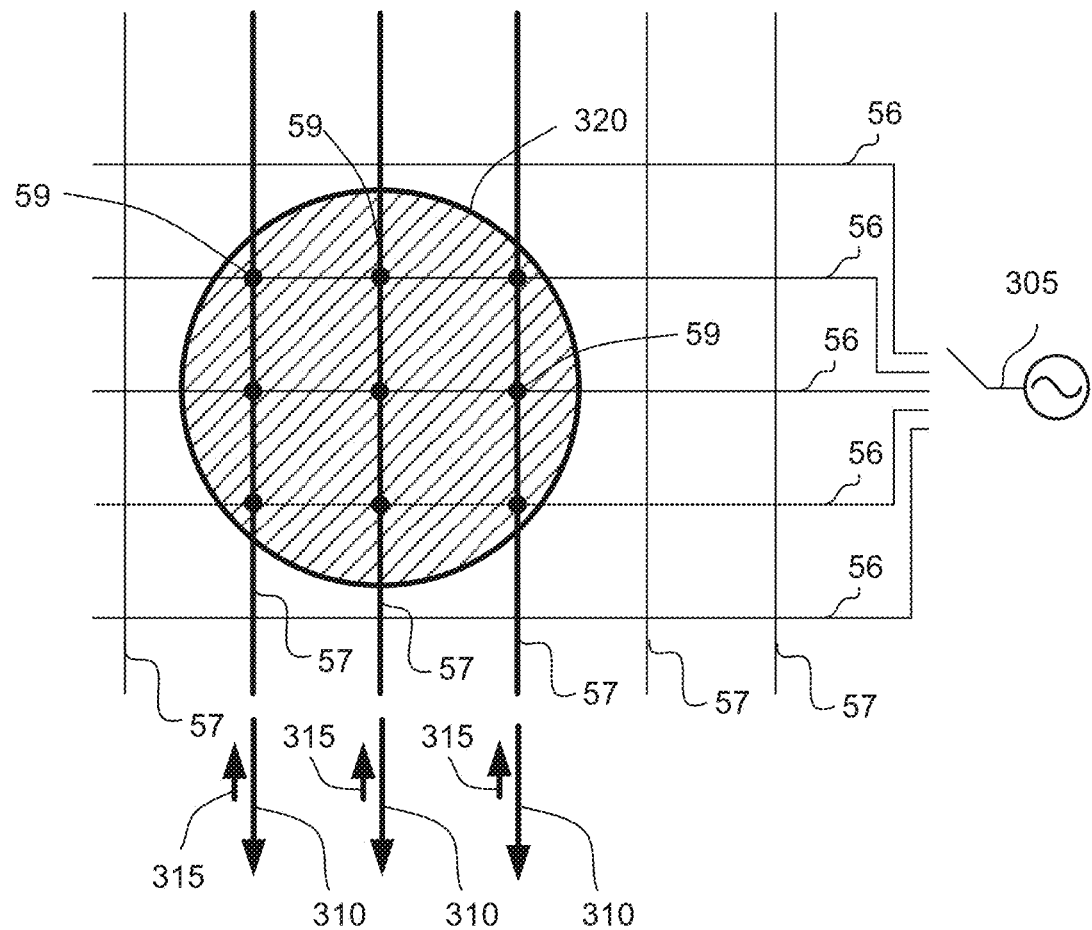
FIG. 3 is a simplified schematic representation of a relative effect on a grid based capacitive sensor with a single touch area.

FIG. 3 shows a schematic representation of the relative effect on a grid based capacitive sensor with one finger touching the digitizer sensor. Only a portion of digitizer sensor 50 is shown for simplicity. A presence of a fingertip 80 at location 320 reduces mutual capacitance at junctions 59 in location 320. Due to the reduced mutual capacitance, when a drive signal 305 is imposed on drive lines 56, amplitudes detected on the touched receive lines 57 are lower than amplitude detected on other receive lines 57. Reduced amplitudes due to the reduced mutual capacitances are represented by arrows 310.

At the same time, potential may be induced on the finger from drive signal 305. This typically occurs while the device is not grounded due to the difference in potential between the user that is grounded and the device. The potential induced on the finger from drive signal 305may be injected on receive lines 57 which increases amplitudes of the outputs as represented by arrows 315. The output detected from the touched receive lines is therefore a summation of amplitude 310 and amplitude 315. Typically, output detected from a single finger touch produces a negative blob having amplitude that varies based on the magnitude of the induced potential. This amplitude sometimes called the finger effect may be used as an indication of a grounding state of the computing device. Low amplitude, e.g. below a defined threshold, due to large induced potential may indicate that the device is ungrounded while high amplitude, e.g. above the defined threshold, due to a small induced potential may indicate that the device is grounded. A grounding state of the device may be monitored by digitizer circuit 25 (FIG. 1) and optionally reported to host 22.

Figure 4A:
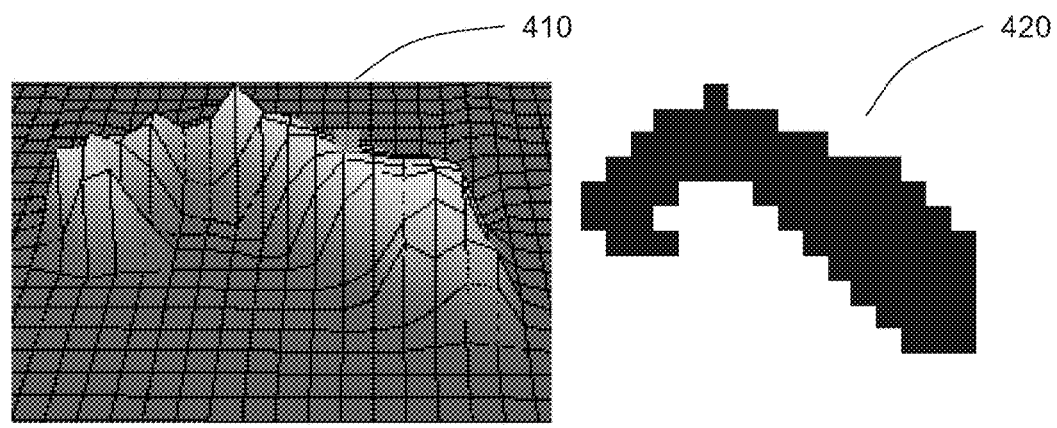
FIGS. 4A and 4B are example heatmaps and corresponding two dimensional blobs of example palm touch signal for a device that is grounded and ungrounded respectively.
Figure 4B:
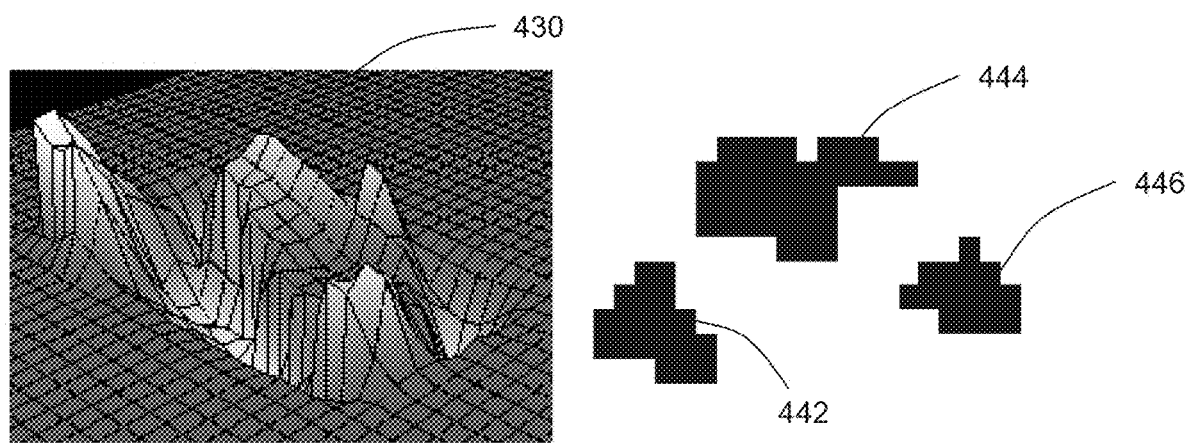

FIGS. 4A and 4B show example heatmaps and corresponding two dimensional blobs of example palm touch signal for a device that is grounded and ungrounded respectively. Heatmaps 410 and 430 show absolute values for amplitude. Relatively large touch areas such as a touch area due to a hand resting on the digitizer sensor may be further affected by the grounding state of the device as compared to a single finger touch. While a computing device is well grounded, a palm touch area may appear as a well defined peak in heat map 410 and blob 420 defined by heat map 410 may appears as a single area that may be clearly distinguished from single finger touch input. However, when a computing device has high impedance to ground, e.g. is ungrounded, a same palm input may produce a heatmap, e.g. heatmap 430 that provides a peak that is not well defined. Distortions in heat map 430 are due to coupling of potentials picked up by the palm that reverse the effect of the touch signal. These distortions may lead to a single palm touch area being depicted as a plurality of separate blobs 442, 444, 446. Digitizer circuit 25 (FIG. 1) may mistakenly identify the palm input as three close finger touches based on heatmap 430.

Figure 5A:
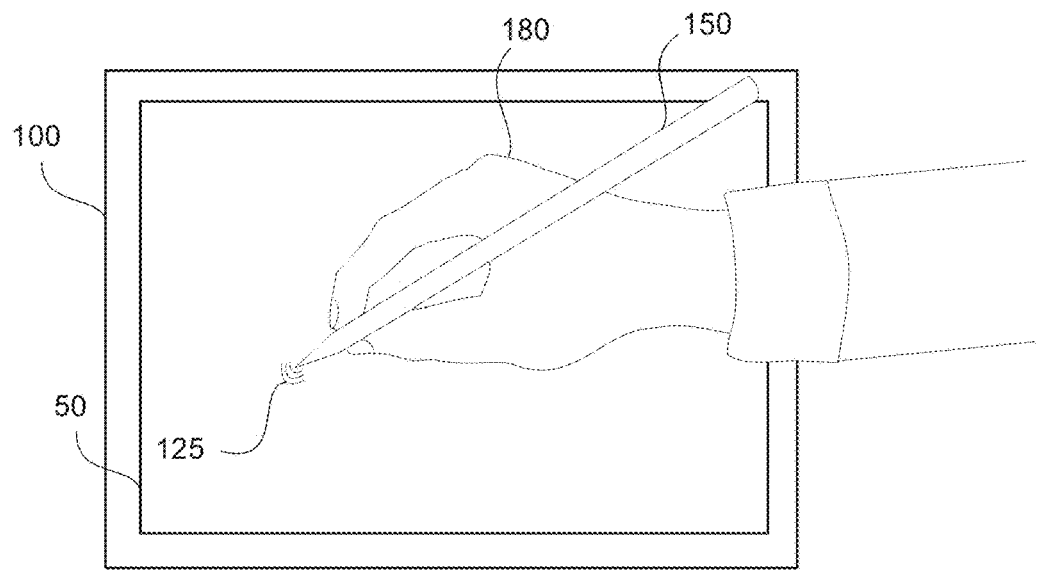
FIGS. 5A, 5B and 5C is a simplified schematic drawing of example simultaneous stylus and palm input to a device and schematic representations of corresponding example outputs when the device is grounded and ungrounded respectively in accordance with some example embodiments of the disclosure.
Figure 5B:
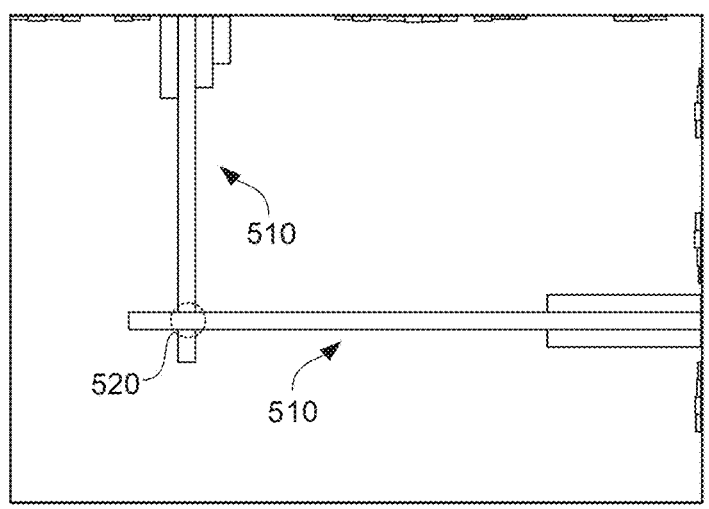
Figure 5C:
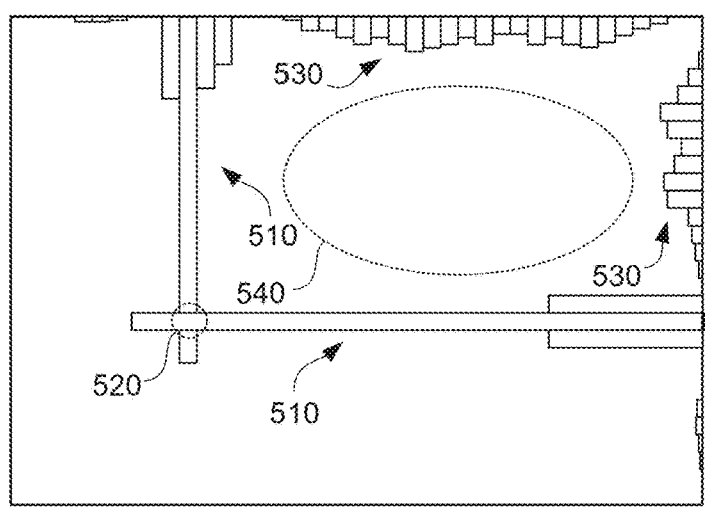

Reference is now made to FIGS. 5A, 5B and 5C showing a simplified schematic drawing of example simultaneous stylus and palm input to a device and schematic representations of corresponding example outputs when the device is grounded and ungrounded respectively in accordance with some example embodiments of the disclosure. While a user is providing input with stylus 150, a hand 180 holding stylus 150 or optionally the opposite hand of the user may be resting on sensor 50. As long as device 100 is well grounded, output detected over stylus sampling window 220 (FIG. 2) is not affected by contact of hand 180 on sensor 50 as shown in FIG. 5B. Device 100 may be well grounded while connected to a power supply with a three-prong connector or based on a user physically contacting a chassis of the device. While device 100 is grounded, output detected may typically show a sharp peak in amplitude 510 in both the row and column conductive material 55 that indicate stylus input at location 520. Peaks 510 may be less sharp when stylus 150 is hovering as opposed to touching device 100.

FIG. 5B shows example output detected over stylus sampling window 220 while device 100 is ungrounded. Device 100 may be ungrounded while connected to power supply with a two-prong connector or while the device is resting on non-conductive surface. While device 100 is not grounded, physical contact between hand 180 and stylus 150 may induce a potential on hand 180 in a frequency band of signal 125 (from writing tip 120, ring 127 or eraser 128).

Contact of hand 180 in a vicinity of conductive strips 55 picking up signal 125 may also induce a potential on hand 180 in the frequency band of signal 125. Due to the induced potential, output 530 on each of the row and column conductive materials 55 in an area 540 of hand touch that may be detected in the stylus sampling window 220. Amplitude of output 530 due to hand 180 picking up potential from signal 125 is typically significantly lower in amplitude as compared to output 510 detected on sensor 50 directly from stylus 150. Amplitude 510 is not expected to differ significantly between a grounded and ungrounded state of the device when using a non-conductive housing for the stylus due to the relatively high impedance between the user and the stylus.

According to some example embodiments, digitizer circuit 25 is configured to detect both stylus input and hand input over a stylus sampling window 220 and to distinguish between them. In some example embodiments, stylus input is identified as a peak spread over a defined number of conductive strips 55 and having amplitude above a defined stylus amplitude threshold, while hand input is identified as a peak spread over a larger number of conductive strips 55 and having amplitude in a defined range below the defined stylus amplitude threshold.

In some example embodiments, touch detection over the stylus sampling window, e.g. in the stylus frequency range is applied to track palm input and to perform palm rejection while device 100 is in an ungrounded state, e.g. poorly grounded. Since output 530 (FIG. 5C) is not detected while drive signals are transmitted on sensor 55 and the output does not suffer from distortions due to potentials picked up by the palm having a reverse the effect of the touch signal. Digitizer circuit 25 may classify size and shape of area 540 and determine that area 540 is palm input based on the classification. In some example embodiments, a heatmap, e.g. heatmap 430 (FIG. 4B) detected over a mutual capacitive sampling window may be verified as input from a palm based on comparing location of touch inputs in the heatmap detected over the mutual capacitive sampling periods 210 with location of area 540 (FIG. 5C) detected over the stylus sampling period 220.

Figure 6A:
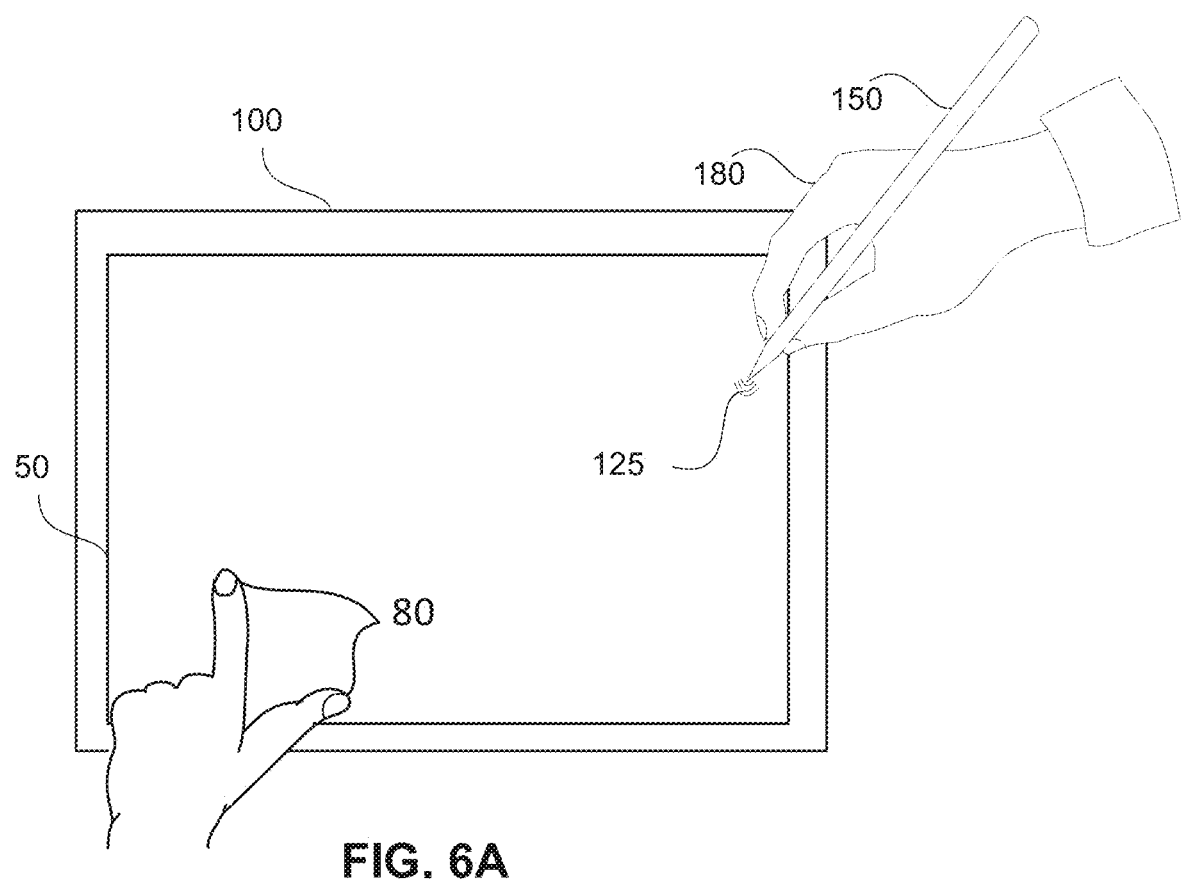
FIGS. 6A and 6B is a simplified schematic drawing showing example simultaneous stylus and finger touch input to a device and schematic representations of corresponding example outputs from stylus detection when the device is ungrounded in accordance with some example embodiments of the disclosure.
Figure 6B:
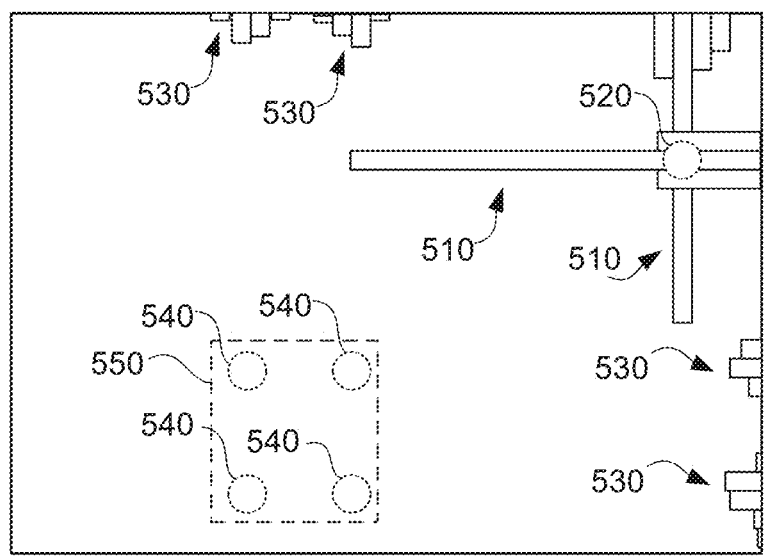

Reference is now made to FIGS. 6A and 6B showing a simplified schematic drawing showing example simultaneous stylus and finger touch input to a device and schematic representations of corresponding example outputs from stylus detection when the device is ungrounded in accordance with some example embodiments of the disclosure. In some example embodiments, while one hand 180 is holding stylus 150, signal 125 may induce a potential on a user that may be detected on sensor 50 when one or more fingertips 80 from the opposite hand simultaneously touches sensor 50. This may occur while device 100 is in an ungrounded state. In some example embodiments, a distinct peak 530 may be detected in the row and column direction for each finger touch over a stylus sampling window. However, coordinates of multiple touches may not always be resolvable based on output 530. For example touch of two fingers 80 may correspond to four potential touch locations 540 based on outputs 530 two of which may be the touch locations and two others may be ghost locations.

In some example embodiments, digitizer circuit 25 may define an inclusive area 550 including all potential touch locations 540 and may use this information during mutual capacitive detection. Optionally, digitizer circuit 25 may reduce an area that is scanned during mutual capacitive detection (optionally only scan area 550) based on area 550 detected over the stylus sampling window 220. Optionally, by reducing the number of drive lines that are scanned, the number of mutual capacitive detection sampling windows 210 may be reduced. Optionally reducing refresh rate.

Figure 7A:
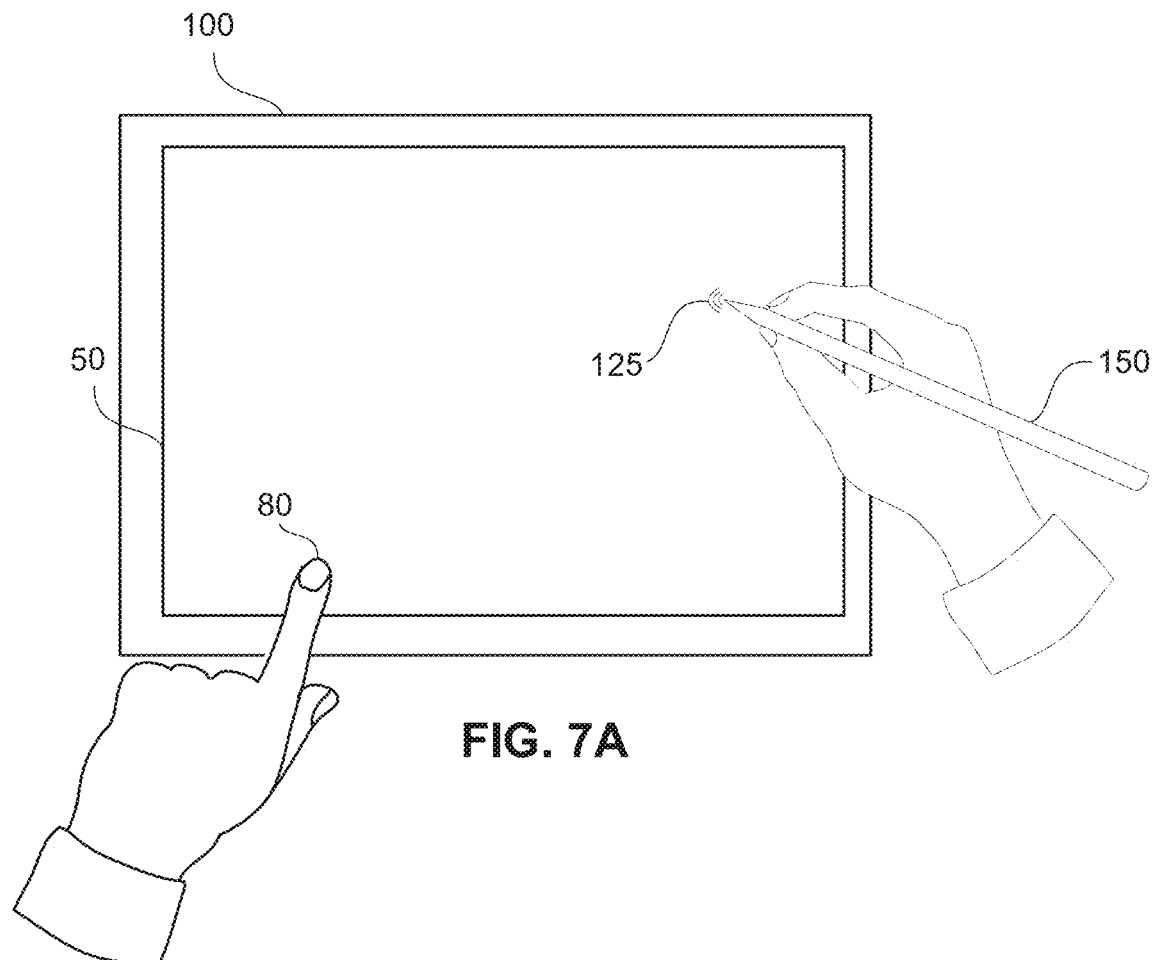
FIGS. 7A and 7B is a simplified schematic drawing showing an example simultaneous stylus and single touch input to a device and schematic representations of corresponding example outputs from stylus detection when the device is ungrounded in accordance with some example embodiments of the disclosure.
Figure 7B:
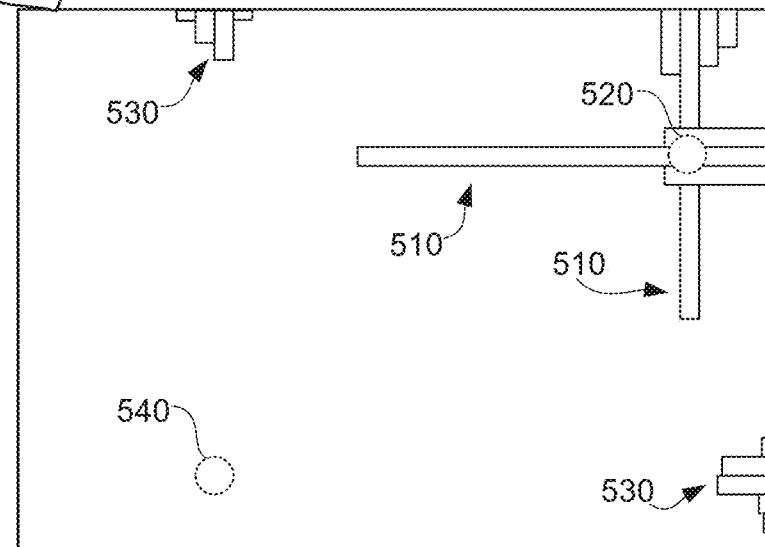

Reference is now made to FIGS. 7A and 7B showing a simplified schematic drawing of an example simultaneous stylus and single touch input to a device and schematic representations of corresponding example outputs from stylus detection when the device is ungrounded in accordance with some example embodiments of the disclosure. According to some example embodiments, during an ungrounded state of device 100, stylus input 520 along with single touch input 540 may be detected over a stylus sampling window 220. Single touch input 540 may be detected based on potential induced on finger 80 touching sensor 50 while an opposite hand 180 is holding stylus 150. In some example embodiments, digitizer circuit 25 detects single touch 540 input over a stylus sampling window and may report coordinates of touch 540 based on output 530 detected over stylus sampling window 220. Optionally, digitizer circuit 25 may reduce the number or the frequency of mutual capacitive detection sampling windows 210 while detecting a single touch 540 is stylus sampling window 220. Optionally, while device 100 is determined to be ungrounded, digitizer circuit 25 may also reduce the number of sampling windows 210 or the refresh rate of mutual capacitive detection when no touch area 540 is detected over stylus sampling period 220.

Figure 8A:
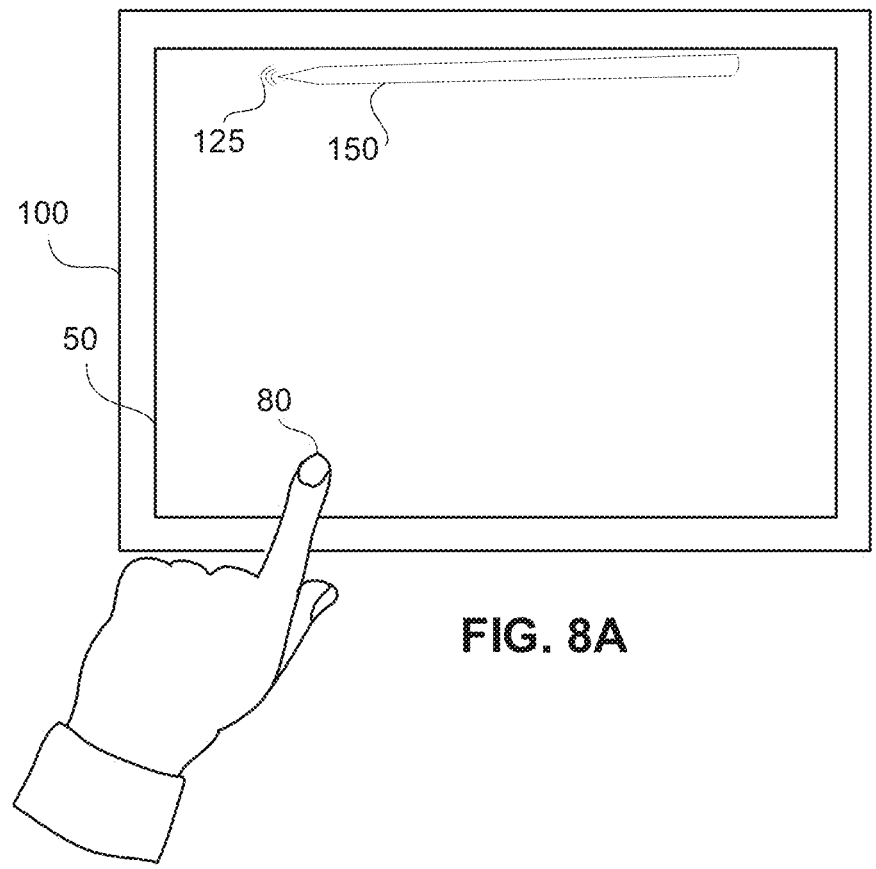
FIGS. 8A and 8B is a simplified schematic drawing showing example single-touch input to a device and schematic representations of corresponding example outputs from stylus detection when the device is ungrounded in accordance with some example embodiments of the disclosure.
Figure 8B:
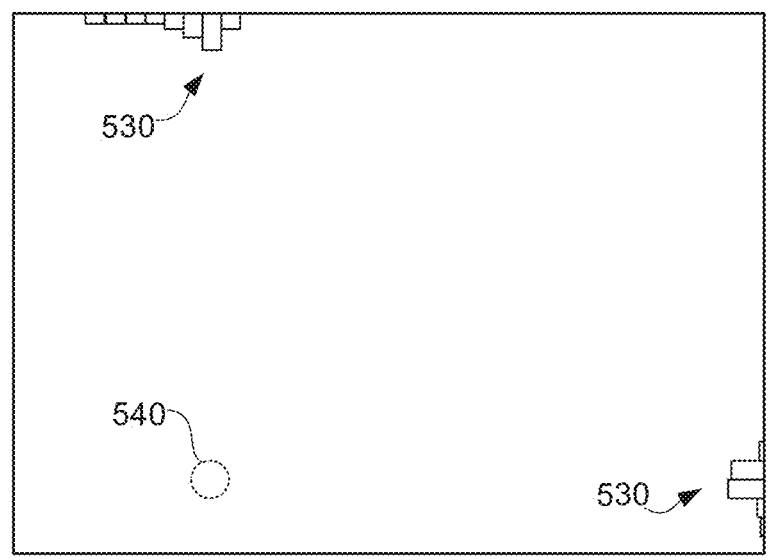

Reference is now made to FIGS. 8A and 8B showing a simplified schematic drawing of an example single-touch input on a device and schematic representations of corresponding example outputs from stylus detection when the device is ungrounded in accordance with some example embodiments of the disclosure. In some example embodiments, touch with fingertip 80 may be detected on sensor 50 over a stylus detection period 220 even when the user is not holding stylus 150. For example stylus 150 may be laying over sensor 50 or adjacent to sensor 50. Optionally, as long as stylus 150 is emitting signal 125 in a vicinity of sensor 50 (by hovering or touching the touch screen), a potential from signal 125 may be induced on fingertip 80 touching sensor 50 while device 100 is in an ungrounded state. In some example embodiments, touch 540 may be detected based on output 530 detected over stylus sampling period 230. Amplitude of peaks in output 530 may be lower during a hover mode of stylus 150, e.g. while the writing tip or eraser end is not touching sensor 50. In some example embodiments, a threshold for detecting touch 540 may be reduced during a hover operational mode. Optionally, the digitizer system may differentiate between a hover and touch mode of stylus 150, e.g. based on a sensor in stylus 150. The threshold for detecting touch 540 may be reduced based on information received from stylus 150.

Figure 9A:
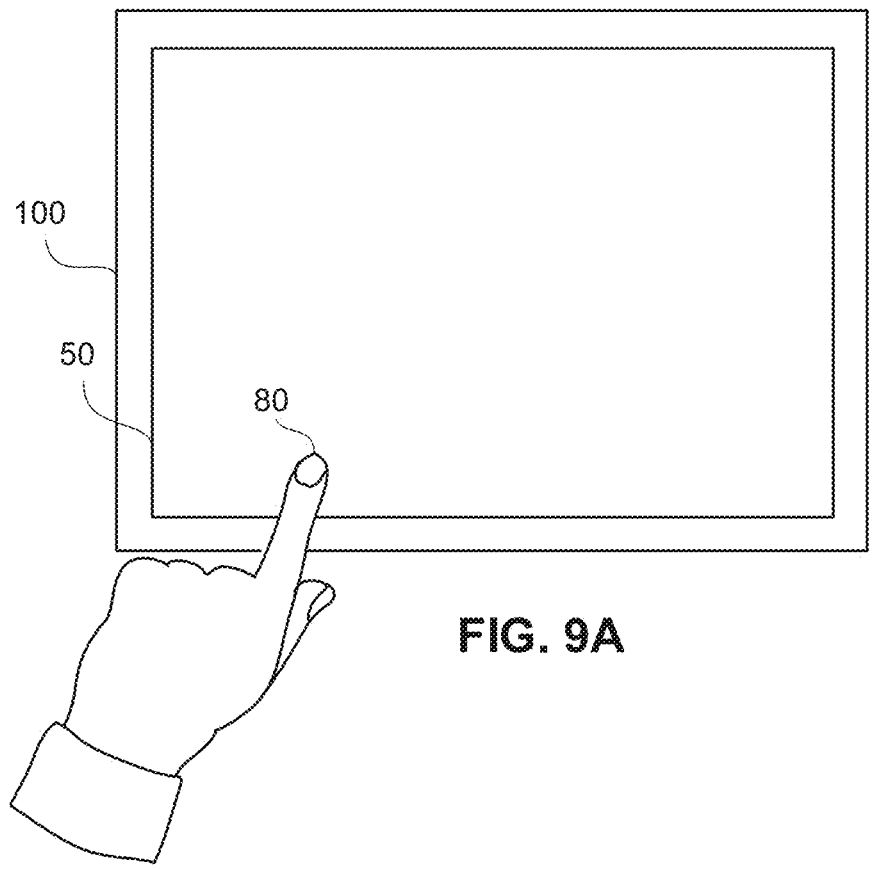
FIGS. 9A and 9B is a simplified schematic drawing showing example single-touch input to a device and schematic representations of corresponding example outputs from noise detection when the device is ungrounded in accordance with some example embodiments of the disclosure.
Figure 9B:

Reference is now made to FIGS. 9A and 9B showing a simplified schematic drawing showing example single-touch input to a device and schematic representations of corresponding example outputs from noise detection when the device is ungrounded in accordance with some example embodiments of the disclosure. In some example embodiments, touch may be detected over various sampling windows, e.g. other than the stylus sampling window 220 and other than the mutual capacitive detection sampling window 210. In some examples, touch may also be detected over a noise sampling window 230 as long as device 100 is in an ungrounded state. In some example embodiments, device 100 may be exposed to noise, e.g. noise from florescent lighting or from a two-prong power supply (ungrounded power supply) and potential from this noise may be induced on fingertip 80 (or hand 180) touching sensor 50 while device 100 is ungrounded. The induced potential from the noise may provide a touch signal in the noise sampling period as long as the noise is in a frequency range sampled. Optionally, digitizer circuit 25 may detect and track finger touch 540 based on output 531 detected in the noise window.

Figure 10:
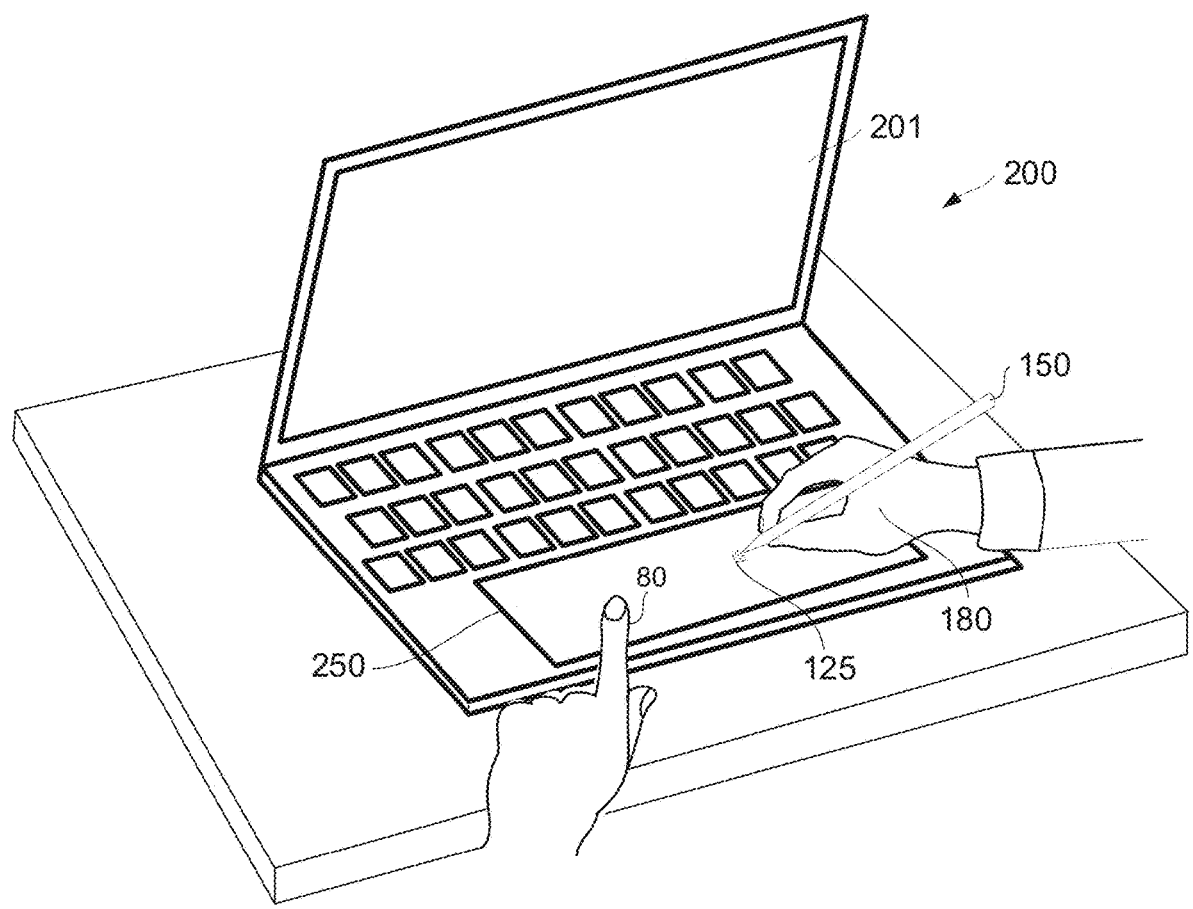
FIG. 10 a simplified block diagram of an exemplary computing device including a touch and pen enabled track pad in accordance with some embodiments of the present disclosure.

Reference is now made to FIG. 10 showing a simplified block diagram of an exemplary computing device including a touch and pen enabled trackpad in accordance with some embodiments of the present disclosure. According to some example embodiments, a device 200 may include a trackpad 250 as a touch sensitive surface that is both touch and pen enabled. Optionally, display 201 of device 200 may or may not be touch and pen enabled. Trackpad 250 may include a grid based capacitive sensor that may be sensitive to a grounding state of device 200. According to some example implementations, the methods described herein to detect touch and perform palm rejection may be similarly applied to track touch and perform palm rejection on trackpad 250.

Figure 11:
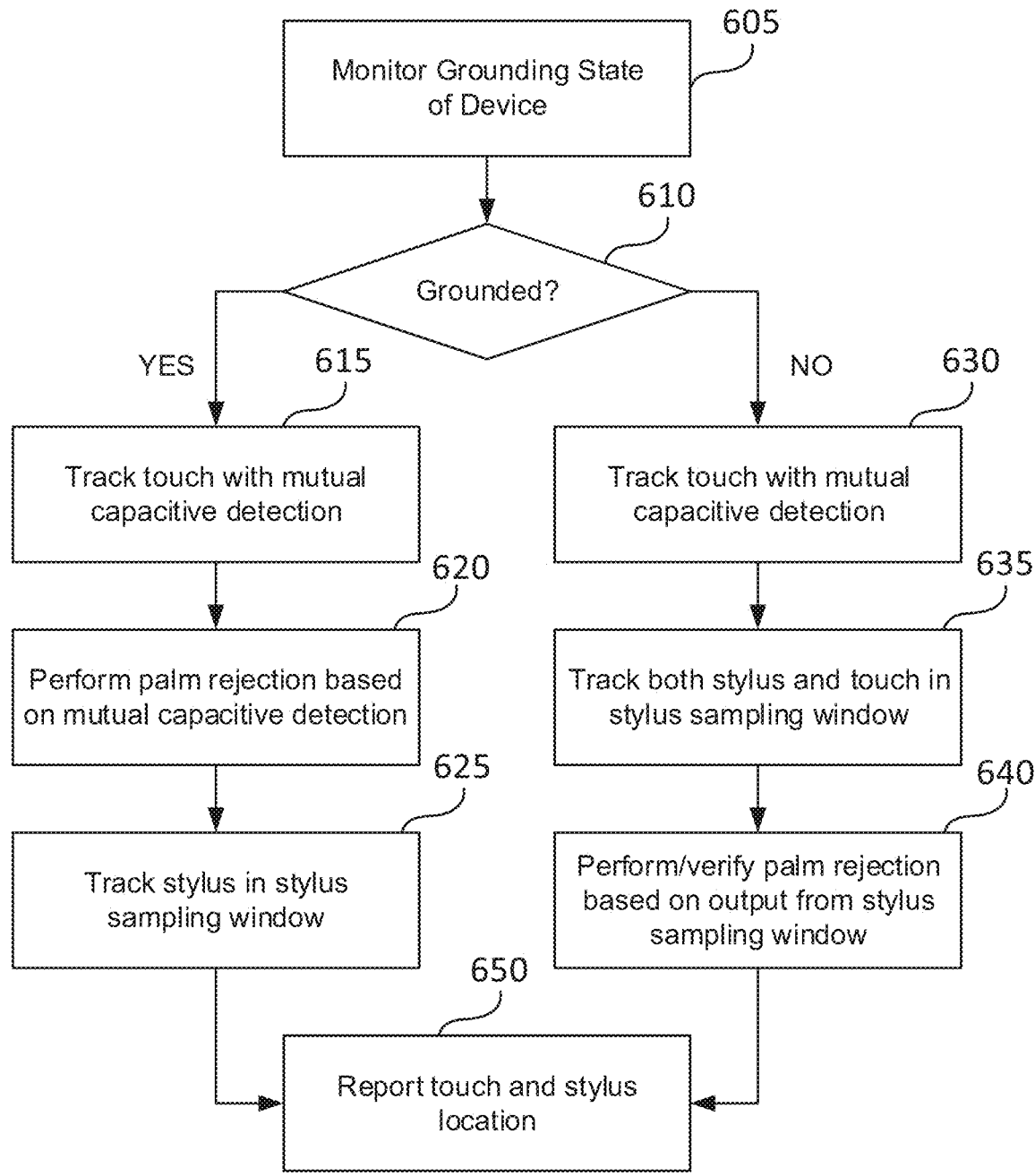
FIG. 11 is a simplified flow chart of an example method for selectively using output from stylus sampling window for palm rejection in accordance with some example embodiments of the disclosure.

Reference is now made to FIG. 11 showing a simplified flow chart of an example method for selectively using output from stylus sampling window for palm rejection in accordance with some example embodiments of the disclosure. In some example embodiments, a grounding state of a touch and pen enabled device is monitored (block 605). Optionally, the device includes a grounding state machine that may detect a grounding state of the device based on relative effects of selected output detected with mutual capacitive detection. In some example embodiments, as long as the device is determined to be grounded (block 610), touch input may be detected over sampling windows dedicated to mutual capacitive detection (block 615). Palm rejection may be based on size and shape of touch area detected during mutual capacitive detection (block 620). Stylus input may be detected over a dedicated stylus sampling window (block 635). Output of the sensor over the stylus sampling window is sampled in a frequency of a signal transmitted by the stylus. Coordinates of finger touch, e.g. intended touch and stylus may be reported to the host computer (block 650).

In some example embodiments, while the device is determined to be ungrounded (block 610), touch may still be tracked with mutual capacitive detection (block 630) and but may also be tracked over a stylus sampling window together with tracking stylus input (block 635). Optionally, the refresh rate for mutual capacitive detection may be reduced while the device is determined to be ungrounded. In some example embodiments, palm rejection may be performed or verified based on touch detected in the stylus sampling window (block 640). Coordinates of finger touch, e.g. intended touch and stylus may be reported to the host computer (block 650)

Figure 12:
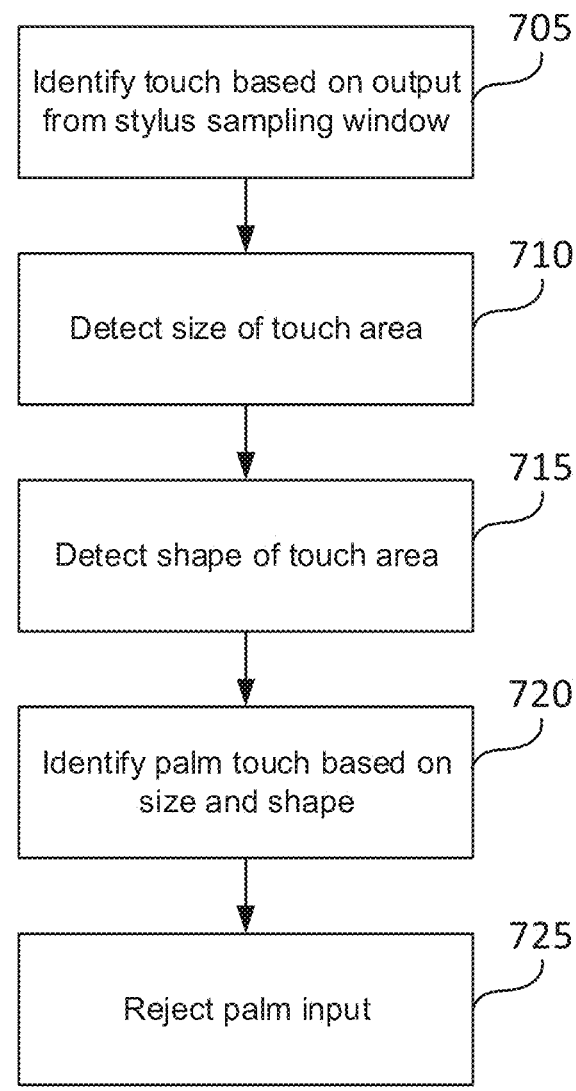
FIG. 12 is a simplified flow chart of an example palm rejection method based on output from stylus sampling window in accordance with some example embodiments of the disclosure.

Reference is now made to FIG. 12 showing a simplified flow chart of an example palm rejection method based on output from stylus sampling window in accordance with some example embodiments of the disclosure. In some example embodiments, touch input may be identified based on output from the stylus sampling window, e.g. output in a frequency range of the stylus signal. In some example embodiments, a touch signal is distinguished from a stylus signal based on amplitude of the output. Output due to touch may be expected to have a lower amplitude and be spread over more conductive lines of the grid based sensor as compared to output due to a stylus tip (eraser end or ring around tip) interacting with the digitizer sensor. In some example embodiments, size of the touch area (block 710) and a shape characteristic of the touch area (block 715) may be detected and palm may be identified based on classification of the size and shape detected (block 720). Optionally, palm input may be rejected, e.g. its location may not be reported to the host computer (block 725).

Figure 13:
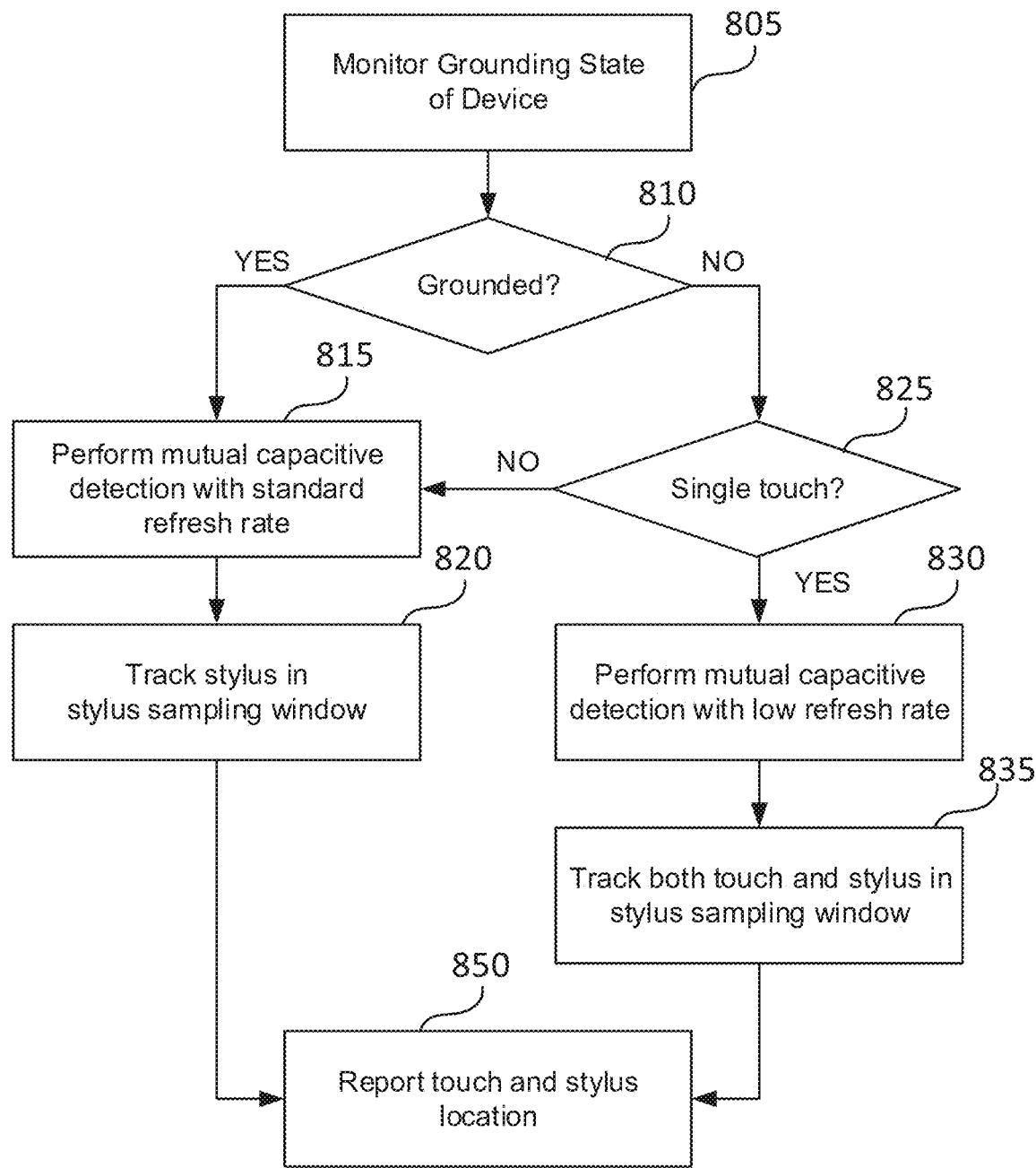
FIG. 13 is a simplified flow chart of an example method for touch and stylus detection in accordance with some example embodiments of the disclosure.

Reference is now made to FIG. 13 showing a simplified flow chart of an example method for touch and stylus detection in accordance with some example embodiments of the disclosure. In some example embodiments, a grounding state of a touch and pen enabled device is monitored (block 805). In some example embodiments, as long as the device is determined to be grounded (block 810), touch input may be detected over sampling windows dedicated to mutual capacitive detection and at a standard refresh rate(block 815). Stylus input may be tracked substantially simultaneously over dedicated stylus sampling windows (block 820). Touch and stylus location may be reported to the host computer (block 850).

In some example embodiments, while the device is determined to be ungrounded (810) and single touch input is identified (block 825), a refresh rate for mutual capacitive detection may be reduced (block 830) and touch tracking may be performed or supplemented based on output from stylus sampling window as long as a stylus signal is being received by the digitizer sensor. Both touch and stylus may be detected over the stylus sampling window (block 835). Touch and stylus location may be reported to the host computer (block 850).

Figure 14:
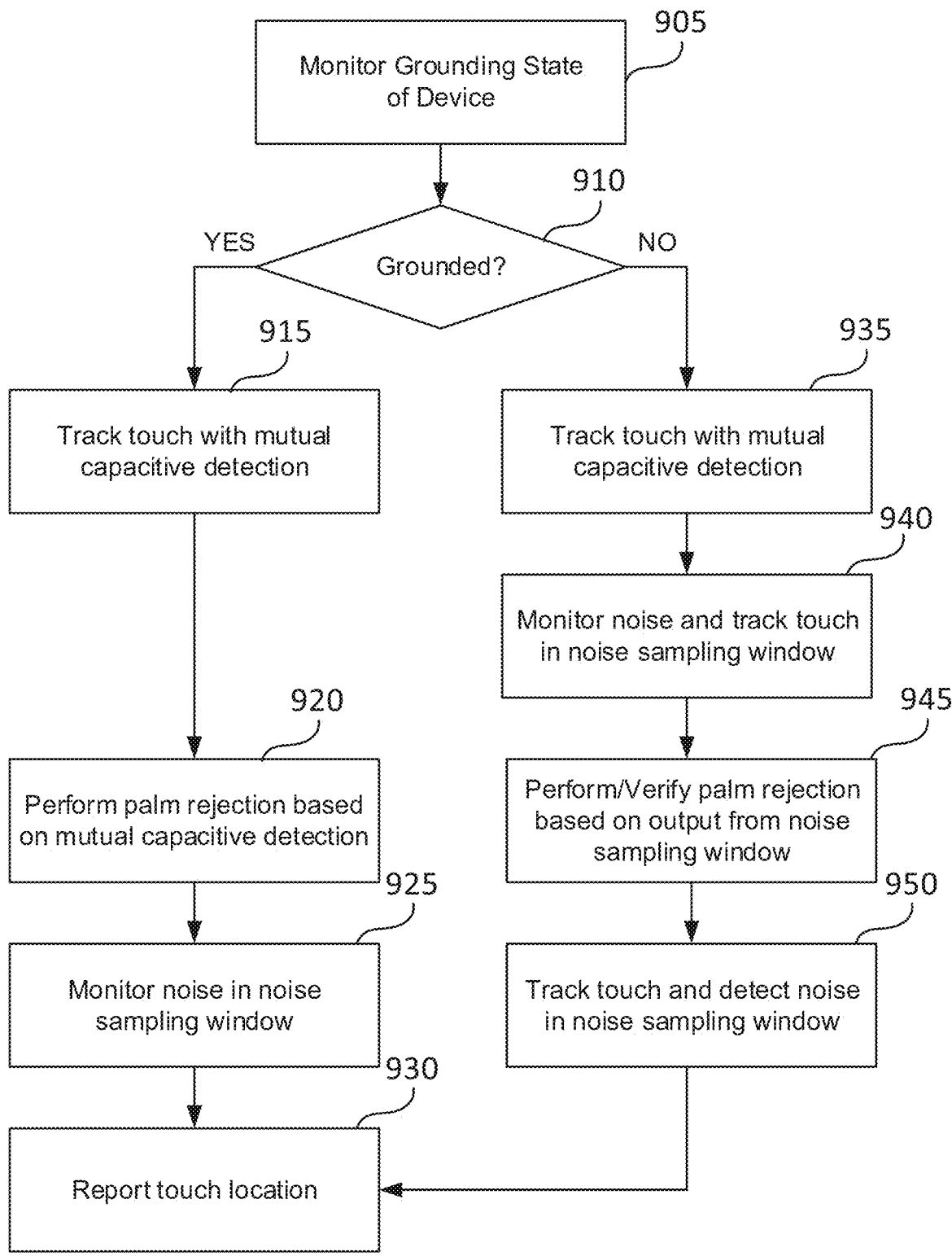
FIG. 14 is a simplified flow chart of an example method for touch detection in accordance with some example embodiments of the disclosure.

Reference is now made to FIG. 14 showing a simplified flow chart of an example method for touch detection in accordance with some example embodiments of the disclosure. In some example embodiments, a grounding state of a touch and pen enabled device is monitored (block 905). In some example embodiments, as long as the device is determined to be grounded (block 910), touch input may be detected over sampling windows dedicated to mutual capacitive detection (block 915). Palm rejection may be based on size and shape of touch area detected during mutual capacitive detection (block 920) and noise may be monitored over dedicated noise sampling windows (block 925). Finger touch locations, e.g. intended touch may be reported to the host computer (block 930).

In some example embodiments, while the device is determined to be ungrounded (block 910), touch input may still be detected over mutual capacitive sampling windows and may also be detected together with noise over noise sampling windows (block 940). Palm rejection may be performed or verified based on touch input detected in the noise sampling window (block 945). Optionally, touch may be tracked together with noise monitoring based on output detected over the noise sampling window (block 950).

According to an aspect of some example embodiments, there is provided a method comprising: sampling output in a frequency range of a signal emitted from a stylus over a stylus sampling window, wherein the sampling is performed simultaneously from both columns and rows of a grid based capacitive sensor; detecting stylus input based on detecting a gain above a stylus threshold in at least one column and one row of the sensor; reporting coordinates of the stylus based on stylus input being detected; detecting touch input from a finger or hand based on detecting a gain between a touch threshold and a stylus threshold, wherein the touch threshold is below the stylus threshold over at least two consecutive columns and two consecutive rows of the sensor; and reporting coordinates of the touch input based on detecting the touch input.

Optionally, the method includes determining that a device including the grid based capacitive sensor is either grounded or ungrounded; and detecting the touch input from the finger or hand based on the output in the stylus frequency range only when the device is ungrounded.

Optionally, the method includes performing mutual capacitive detection; determining gains of selected touch areas detected over the mutual capacitive detection; determining that the device either grounded or ungrounded based on the gains.

Optionally, the method includes detecting a heatmap on the grid based capacitive sensor based on mutual capacitive detection; identifying a plurality of blobs on the heatmap; comparing an area of the touch input detected over the stylus sampling window with the plurality of blobs identified in the heatmap; and reporting the coordinates of the touch input based on the comparing.

Optionally, the method includes performing palm rejection based on the comparing and refraining from reporting coordinates of the palm input.

Optionally, the method includes determining size of the touch input; and identifying the touch input as palm input based on the size.

Optionally, the method includes determining a shape characteristic of a spread of the touch input over the sensor; and identifying the touch input as palm input based on the size.

Optionally, the method includes identifying a single area of the touch input over the stylus sampling window; and reducing a refresh rate for mutual capacitive detection of the sensor based on identifying the single area of the touch input.

Optionally, the method includes identifying a single area of the touch input over the stylus sampling window; and temporarily suspending mutual capacitive detection of the sensor based on identifying the single area of the touch input.

Optionally, the method includes identifying a plurality of touch inputs over a defined area over the stylus sampling window; and performing mutual capacitive detection of the sensor only over the defined area.

According to an aspect of some example embodiments, there is provided a method including determining that a device that includes a grid based capacitive sensor is either grounded or ungrounded; and sampling output of the grid based capacitive sensor over a plurality of sampling windows; performing mutual capacitive detection over a first sampling window from the plurality; sampling output from both columns and rows of the grid based sensor over a second sampling window from the plurality, wherein the output is sampled without driving the column or rows with a driving signal emitted by a controller configured to operate the grid based capacitive sensor; identifying a heatmap based on the mutual capacitive detection over the first sampling window; identifying areas of touch input from the output sampled over the second sampling window based on determining that the device is ungrounded; comparing the heatmap to the areas of touch input identified based on determining that the device is ungrounded; and reporting coordinates of touch based on the comparing.

Optionally, the second sampling window is a sampling window configured for tracking a stylus, wherein the stylus is configured to transmit a signal.

Optionally, the second sampling window is a sampling window configured for sampling a noise environment of the grid based capacitive sensor.

Optionally, the output sampled over the second sampling window is in a frequency range of noise from a power supply that is not grounded or in a frequency range of noise based on fluorescent lights.

Optionally, the method includes performing palm rejection based on identifying the areas of touch input from the output sampled over the second sampling window.

Optionally, the method includes determining a size of the areas of the touch input from the output sampled over the second sampling window; determining a shape characteristic of a spread over the sensor of the areas of the touch input from the output sampled; and identifying at least one of the areas as palm input based on the shape.

Optionally, the method includes identifying a plurality of blobs on the heatmap; comparing the areas of the touch input detected over the second sampling window with the plurality of blobs identified in the heatmap; and reporting the coordinates of the touch input based on the comparing.

Optionally, the includes identifying at least a portion of the plurality of blobs as palm input based on the comparing and refraining from reporting coordinates of the palm input.

Optionally, the method includes identifying a single area of the touch input over the second sampling window; and reducing a number of sampling windows in which mutual capacitive detection is performed over subsequent refresh periods based on identifying the single area of the touch input.

Optionally, the method includes identifying a single area of the touch input over the second sampling window; and temporarily suspending mutual capacitive detection of the sensor over subsequent refresh periods of the sensor based on identifying the single area of the touch input.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising: sampling output in a frequency range of a signal emitted from a stylus over a stylus sampling window, wherein the sampling is performed simultaneously from both columns and rows of a grid based capacitive sensor; determining that a device including the grid based capacitive sensor is either grounded or ungrounded; and detecting the touch input from a finger or hand based on the output in the stylus frequency range only when the device is ungrounded; detecting stylus input based on detecting a gain above a stylus threshold in at least one column and one row of the sensor; reporting coordinates of the stylus based on stylus input being detected; detecting touch input from the finger or hand based on detecting a gain between a touch threshold and a stylus threshold, wherein the touch threshold is below the stylus threshold over at least two consecutive columns and two consecutive rows of the sensor; and reporting coordinates of the touch input based on detecting the touch input.

2. The method of claim 1, comprising:
performing mutual capacitive detection;
determining gains of selected touch areas detected over the mutual capacitive detection; and
determining that the device either grounded or ungrounded based on the gains.

3. The method according to claim 1 comprising:
  detecting a heatmap on the grid based capacitive sensor based on mutual capacitive detection;
  identifying a plurality of blobs on the heatmap;
  comparing an area of the touch input detected over the stylus sampling window with the plurality of blobs identified in the heatmap; and
  reporting the coordinates of the touch input based on the comparing.

4. The method according to claim 3 comprising performing palm rejection based on the comparing and refraining from reporting coordinates of the palm input.

5. The method according to claim 1, comprising:
  determining size of the touch input; and
  identifying the touch input as palm input based on the size.

6. The method according to claim 1, comprising:
  identifying a single area of the touch input over the stylus sampling window; and
  reducing a refresh rate for mutual capacitive detection of the sensor based on identifying the single area of the touch input.

7. The method according to claim 1, comprising:
  identifying a single area of the touch input over the stylus sampling window; and
  temporarily suspending mutual capacitive detection of the sensor based on identifying the single area of the touch input.

8. The method according to claim 1, comprising:
  identifying a plurality of touch inputs over a defined area over the stylus sampling window;
  and
  performing mutual capacitive detection of the sensor only over the defined area.

9. A method comprising:
  determining that a device that includes a grid based capacitive sensor is either grounded or ungrounded; and
  sampling output of the grid based capacitive sensor over a plurality of sampling windows;
  performing mutual capacitive detection over a first sampling window from the plurality;
  sampling output from both columns and rows of the grid based sensor over a second sampling window from the plurality, wherein the output is sampled without driving the column or rows with a driving signal emitted by a controller configured to operate the grid based capacitive sensor;
  identifying a heatmap based on the mutual capacitive detection over the first sampling window;
  identifying areas of touch input from the output sampled over the second sampling window based on determining that the device is ungrounded;
  comparing the heatmap to the areas of touch input identified based on determining that the device is ungrounded; and
  reporting coordinates of touch based on the comparing.

10. The method according to claim 9, wherein the second sampling window is a sampling window configured for tracking a stylus, wherein the stylus is configured to transmit a signal.

11. The method of claim 9, wherein the second sampling window is a sampling window configured for sampling a noise environment of the grid based capacitive sensor.

12. The method of claim 11, wherein the output sampled over the second sampling window is in a frequency range of noise from a power supply that is not grounded or in a frequency range of noise based on fluorescent lights.

13. The method of claim 9, comprising performing palm rejection based on identifying the areas of touch input from the output sampled over the second sampling window.

14. The method according to claim 13 comprising:
  determining a size of the areas of the touch input from the output sampled over the second sampling window;
  determining a shape characteristic of a spread over the sensor of the areas of the touch input from the output sampled; and
  identifying at least one of the areas as palm input based on the shape.

15. The method of claim 9 comprising:
  identifying a plurality of blobs on the heatmap;
  comparing the areas of the touch input detected over the second sampling window with the plurality of blobs identified in the heatmap; and
  reporting the coordinates of the touch input based on the comparing.

16. The method according to claim 15 comprising identifying at least a portion of the plurality of blobs as palm input based on the comparing and refraining from reporting coordinates of the palm input.

17. The method according to claim 9 comprising:
  identifying a single area of the touch input over the second sampling window; and
  reducing a number of sampling windows in which mutual capacitive detection is performed over subsequent refresh periods based on identifying the single area of the touch input.

18. The method according to claim 9 comprising:
  identifying a single area of the touch input over the second sampling window; and
  temporarily suspending mutual capacitive detection of the sensor over subsequent refresh periods of the sensor based on identifying the single area of the touch input.

19. A device comprising:
  a processing unit; and
  a memory coupled to the processing unit and storing instructions for execution by the processing unit, the instructions, upon execution by the processing unit, causing the device to perform acts comprising:
    determining that a device that includes a grid based capacitive sensor is either grounded or ungrounded; and
    sampling output of the grid based capacitive sensor over a plurality of sampling windows;
    performing mutual capacitive detection over a first sampling window from the plurality;
    sampling output from both columns and rows of the grid based sensor over a second sampling window from the plurality, wherein the output is sampled without driving the column or rows with a driving signal emitted by a controller configured to operate the grid based capacitive sensor;
    identifying a heatmap based on the mutual capacitive detection over the first sampling window;
    identifying areas of touch input from the output sampled over the second sampling window based on determining that the device is ungrounded;
    comparing the heatmap to the areas of touch input identified based on determining that the device is ungrounded; and
    reporting coordinates of touch based on the comparing.

* * * * *